United States Patent
Kim et al.

(10) Patent No.: US 8,797,710 B2
(45) Date of Patent: *Aug. 5, 2014

(54) MULTILAYER CERAMIC CAPACITOR

(71) Applicant: Samsung Electro-Mechanics Co., Ltd., Gyunggi-do (KR)

(72) Inventors: Sang Huk Kim, Gyunggi-do (KR); Jae Sung Park, Gyunggi-do (KR); Sung Hyuk Choi, Gyunggi-do (KR); Seon Ki Song, Gyunggi-do (KR); Han Nah Chang, Gyunggi-do (KR); Byung Soo Kim, Gyunggi-do (KR)

(73) Assignee: Samsung Electro-Mechanics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,363

(22) Filed: Sep. 25, 2013

(65) Prior Publication Data

US 2014/0092522 A1 Apr. 3, 2014

Related U.S. Application Data

(63) Continuation of application No. 13/479,012, filed on May 23, 2012, now Pat. No. 8,559,160.

(30) Foreign Application Priority Data

May 31, 2011 (KR) .......... 10-2011-0052509

(51) Int. Cl.
*H01G 4/005* (2006.01)
*H01G 4/06* (2006.01)

(52) U.S. Cl.
USPC .......... 361/303; 361/311; 361/301.4

(58) Field of Classification Search
CPC ...... H01G 4/005; H01G 4/0085; H01G 4/012
USPC ........ 361/301.4, 303–305
See application file for complete search history.

(56) References Cited

U.S. PATENT DOCUMENTS

| 8,559,160 B2 * | 10/2013 | Kim et al. ..... 361/303 |
| 2007/0025060 A1 | 2/2007 | Kim et al. |

FOREIGN PATENT DOCUMENTS

| JP | 2002-184648 A | 6/2002 |
| JP | 2004-022859 A | 1/2004 |
| JP | 2006-013245 A | 1/2006 |

* cited by examiner

*Primary Examiner* — Eric Thomas
(74) *Attorney, Agent, or Firm* — McDermott Will & Emery LLP

(57) ABSTRACT

There is provided a multilayer ceramic capacitor. The capacitor includes: a multilayer body having a dielectric layer; and first and second internal electrodes disposed in the multilayer body, the dielectric layer being disposed between the first and second internal electrodes, wherein, in a cross-section taken in a width-thickness direction of the multilayer body, an offset portion is defined as a portion where adjacent first and second internal electrodes do not overlap with each other, and a ratio (t1/td) of a width t1 of the offset portion to a thickness td of the dielectric layer is 1 to 10.

6 Claims, 2 Drawing Sheets

A-A'

B-B'

C

MULTILAYER CERAMIC CAPACITOR

CROSS-REFERENCE TO RELATED APPLICATIONS

This application is a Continuation of U.S. application Ser. No. 13/479,012, filed on May 23, 2013, now U.S. Pat. No. 8,559,160, which claims the priority of Korean Patent Application No. 10-2011-0052509 filed on May 31, 2011, in the Korean Intellectual Property Office, the disclosures of which are incorporated herein by reference.

BACKGROUND OF THE INVENTION

1. Field of the Invention

The present invention relates to a multilayer ceramic capacitor and, more particularly, a high capacity multilayer ceramic capacitor having excellent reliability and able to withstand insulation breakdown even at a high voltage.

2. Description of the Related Art

In general, an electronic component fabricated using a ceramic material, such as a capacitor, an inductor, a piezoelectric device, a varistor, a thermistor, or the like, generally has a ceramic body made of a ceramic material, internal electrodes provided in the ceramic body, and external electrodes (that is, termination electrodes) placed on surfaces of the ceramic body so as to be connected to respective internal electrodes.

Among ceramic electronic components, a multilayer ceramic capacitor has beneficial features such as small size but high capacity, ease of mounting, and the like, and is therefore widely used as a component of mobile communications equipment such as computers, PDAs, mobile phones, and so forth.

In recent years, with the trend towards smaller sized multifunctional electronic products, electronic parts have have tended to have a smaller size and high performance. In response, high capacity multilayer ceramic capacitors having a large capacity while having a small size are required. Accordingly, a multilayer ceramic capacitor, in which thicknesses of dielectric layers and internal electrodes are decreased, such that the dielectric layers and internal electrodes are highly-multilayered, is currently being manufactured.

However, with a decrease in a thickness of dielectric layers and an increase in the number of multilayered dielectric layers, a difference in density between an effective capacity portion having an internal electrode formed thereon and a margin portion having no internal electrode formed thereon is considerably increased. As a result, the margin portion may be delaminated or cracked to thereby allow a plating solution to penetrate thereinto, whereby a deterioration in reliability of the multilayer ceramic capacitor may be caused.

Meanwhile, in a case in which a thickness of a dielectric layer is decreased to thereby allow for an increase in voltage per unit thickness, the dielectric breakdown of the dielectric layer may be possibly caused even when a low voltage is applied thereto.

In particular, when a cross-section of the capacitor is viewed in a width and thickness direction, both ends of an internal electrode in the width direction may have a wedge shape as the internal electrode extends during compressing, such that an electric field strength at the both ends may be more increased due to a notch effect. In addition, a high electric field strength is overlapped at the ends of adjacent internal electrodes in a lamination direction, thus easily causing dielectric breakdowns. Therefore, there are limitations in the development of a high capacity multilayer ceramic capacitor and the miniaturization thereof.

SUMMARY OF THE INVENTION

An aspect of the present invention provides a multilayer ceramic capacitor having high reliability, capable of realizing miniaturization and an increase in capacity of the multilayer ceramic capacitor and, in addition, not causing insulation breakdown even at high voltages.

According to an aspect of the present invention, there is provided a multilayer ceramic capacitor, including: a multilayer body having a dielectric layer; and first and second internal electrodes disposed in the multilayer body, the dielectric layer being disposed between the first and second internal electrode; wherein, in a cross-section taken in a width-thickness direction of the multilayer body, the first and second internal electrodes are offset in a width direction, and an offset portion is defined as a portion where adjacent first and second internal electrodes do not overlap with each other, and wherein a ratio (t1/td) of a width t1 of the offset portion to a thickness td of the dielectric layer is 1 to 10.

The width t1 may be defined as a minimum width of the offset portion, and the thickness td of the dielectric layer is defined as an average thickness of the dielectric layers.

The thickness td of the dielectric layer may be 0.65 μm or less.

The second internal electrode may be alternately offset to the right and left, in the width direction with respect to the first internal electrode.

The minimum width t1 may range from 0.8 to 5.8 μm.

The multilayer ceramic capacitor may have a length and width of 0.6±0.09 μmm and 0.3±0.09 μmm, respectively.

200 or more dielectric layers may be laminated.

According to another aspect of the present invention, there is provided a multilayer ceramic capacitor, including: a multilayer body having first and second sides; first and second internal electrodes provided in the multilayer body, and having ends exposed to the first and second sides, respectively; and a dielectric layer disposed between the first and second internal electrodes and having a thickness td of 0.65 μm or less, wherein, in a width-thickness cross-section of the multilayer body, a ratio (t1/td) of a minimum width t1 of an offset portion to the thickness td of the dielectric layer ranges from 1 to 10, wherein the offset portion is defined as a portion where adjacent first and second internal electrodes do not overlap to be offset from each other.

The thickness td of the dielectric layer may be a distance between the first and second internal electrodes disposed to be adjacent.

The second internal electrode may be alternately offset to the right and left, in the width direction with respect to the first internal electrode.

The minimum width t1 may range from 0.8 to 5.8 μm.

The multilayer ceramic capacitor may have a length and width of 0.6±0.09 μmm and 0.3±0.09 μmm, respectively.

200 or more dielectric layers may be laminated

According to another aspect of the present invention, there is provided a multilayer ceramic capacitor, including: a multilayer body having first and second sides; first and second internal electrodes provided in the multilayer body, and having ends exposed to the first and second sides, respectively, wherein, in a cross-section of the multilayer body, substantially perpendicular to a first direction thereof, a ratio (t1/td) of a width t1 of an offset portion where the first and second internal electrodes disposed to be adjacently offset from each other in a second direction substantially perpendicular to the first direction, to a distance td between the first and second internal electrodes disposed to be adjacent ranges from 1 to 10. The distance td between the first and second internal electrodes disposed to be adjacent may be 0.65 μm or less.

The distance td between the first and second internal electrodes disposed to be adjacent may be 0.65 μm or less.

The second internal electrode may be alternately offset, to the right and left in the width direction with respect to the first internal electrode.

The width t1 of the offset portion may range from 0.8 to 5.8 μm.

The width t1 may be defined as a minimum width of the offset portion.

The multilayer ceramic capacitor may have a length and width of 0.6±0.09 μmm and 0.3±0.09 μmm, respectively 200 or more dielectric layers may be laminated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF EMBODIMENTS

Figure 1:
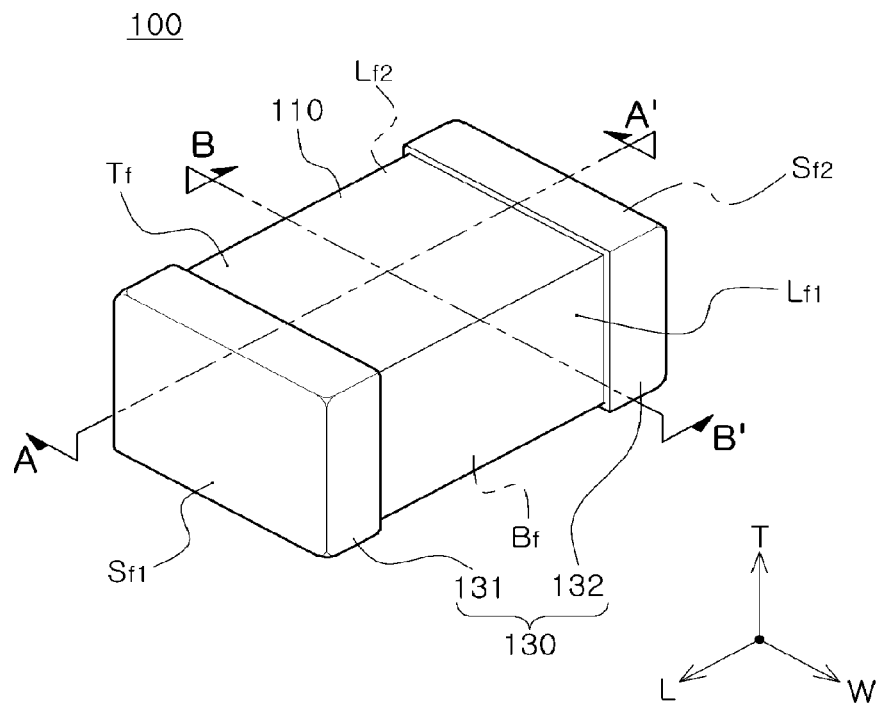
FIG. 1 is a perspective view showing an exterior of a multilayer ceramic capacitor according to an embodiment of the present invention.

Hereinafter, preferred embodiments of the present invention will be described in detail with reference to accompanying drawings. However, various modifications of the foregoing embodiments may be possible and the scope of the present invention is not limited to embodiments described below. Such embodiments are provided to offer a clearer understanding of the present invention to those having ordinary knowledge in the related art in order to fully explain the present invention.

In addition, the shapes and/or sizes of respective elements shown in the accompanying drawings may be enlarged for clarity and like reference numerals denote elements having substantially the same configurations or performing similar functions and actions through the drawings.

Figure 2:
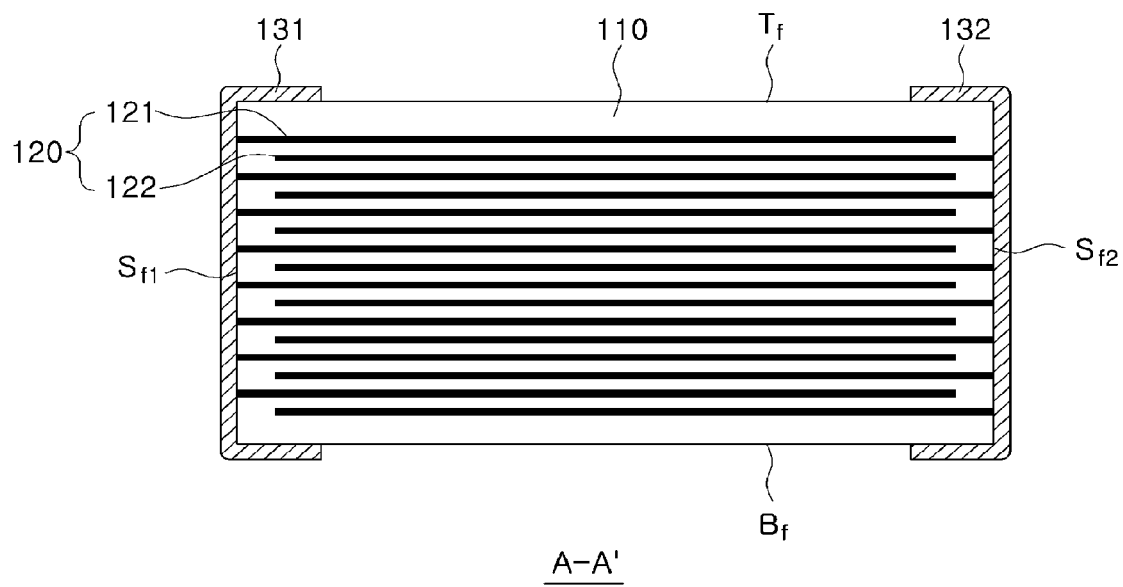
FIG. 2 is a cross-sectional view of the multilayer ceramic capacitor according to an embodiment of the present invention illustrated in FIG. 1, taken in direction A-A'.
Figure 3:
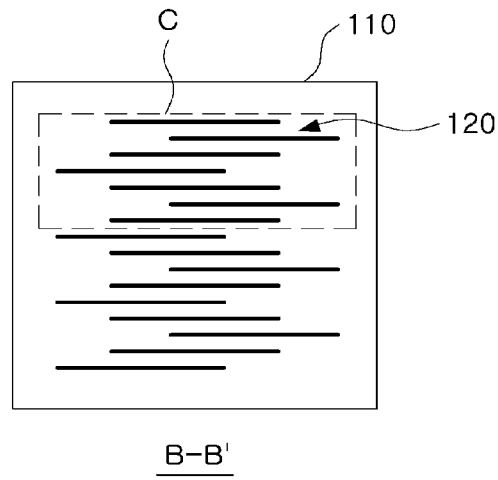
FIG. 3 is a cross-sectional view of the multilayer ceramic capacitor according to an embodiment of the present invention illustrated in FIG. 1, taken in direction B-B'.
Figure 4:
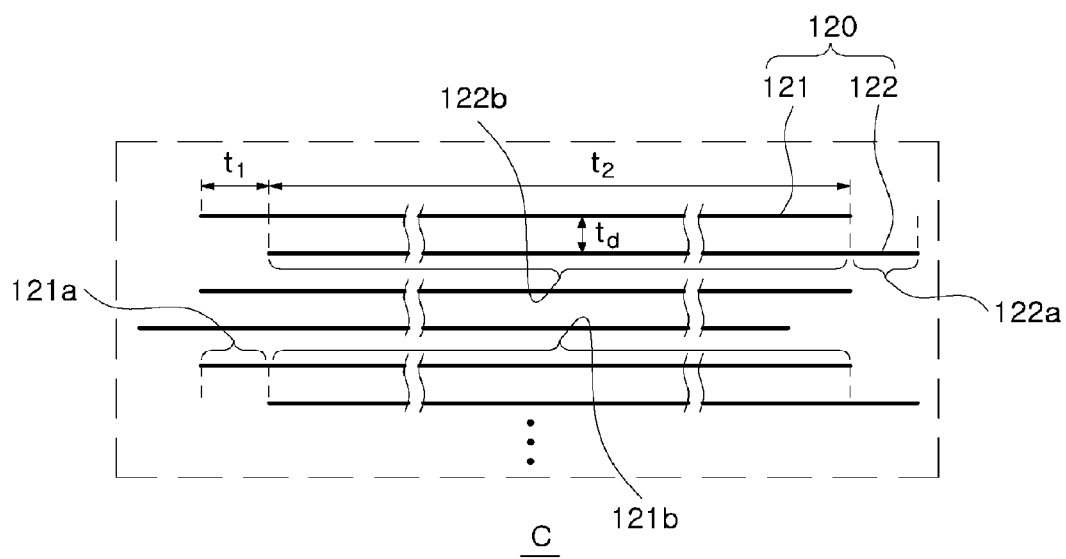
FIG. 4 is an enlarged view of portion C shown in FIG. 3.

FIG. 1 is a perspective view showing an exterior of a multilayer ceramic capacitor according to an embodiment of the present invention. FIG. 2 is a cross-sectional view of the multilayer ceramic capacitor according to an embodiment of the present invention illustrated in FIG. 1, taken in direction A-A'. FIG. 3 is a cross-sectional view of the multilayer ceramic capacitor according to an embodiment of the present invention illustrated in FIG. 1, taken in direction B-B'. FIG. 4 is an enlarged view of portion C shown in FIG. 3.

Referring to FIGS. 1 to 3, a multilayer ceramic capacitor 100 according to the present embodiment may include a multilayer body 110 and an external electrode 130.

The multilayer body 110 may have a rectangular parallelepiped shape. In embodiments of the present invention, surfaces in a lamination direction are defined as a top face Tf and a bottom face Bf, surfaces in a length direction are defined as first and second short faces Sf1 and Sf2, and surfaces in a width direction are defined as first and second long faces Lf1 and Lf2, respectively.

Meanwhile, with regard to the multilayer ceramic capacitor in the embodiments of the present invention, a 'length direction' may be defined as an direction shown in FIG. 1. Likewise, a 'width direction' may be defined as a 'W' direction and a 'thickness direction' may be defined as a 'T' direction. Here, the 'thickness direction' may have the same conception as a direction of stacked dielectric layers, that is, a 'lamination direction.' Moreover, in the case in which the internal electrodes are laminated in a horizontal direction, the 'width direction' and 'thickness direction' described above may be reversed to each other. In addition, the 'length direction', 'width direction' and 'thickness direction' described above, may also be defined as first, second and third directions perpendicular to one another, regardless of their order.

The multilayer body 110 may be formed by laminating a plurality of dielectric layers in the thickness direction T. The plurality of dielectric layers constituting the multilayer body 110 may be fired and integrally formed together, such that a boundary between adjacent dielectric layers may not be distinguished.

Each dielectric layer may be formed of a ceramic powder having a high dielectric permittivity and the ceramic powder used herein may include, but is not limited to, barium titanate ($BaTiO_3$) powder, strontium titanate ($SrTiO_3$) powder, or the like.

After firing the ceramic powder to form the dielectric layers in the embodiments of the present invention, one of the plurality of dielectric layers may have an average thickness of 0.65 μm or less.

In an embodiment of the present invention, a thickness of each of the dielectric layers may refer to an average thickness of the dielectric layer disposed between internal electrodes 121 and 122. The average thickness of the dielectric layer may be measured by image-scanning a cross-section in the length direction of the multilayer body 110 through a scanning electron microscope (SEM), as shown in FIG. 4. For instance, an average thickness may be acquired by measuring thicknesses of a dielectric layer in 30 positions in the length L direction thereof, the 30 positions being located at equal intervals, from an extracted image of the dielectric layer obtained by scanning a cross-section taken in a width-thickness direction (W-T) at the center of the multilayer body 110 in the length direction, through the SEM (magnified 10,000 times), and then averaging the values of the measured thicknesses. The 30 positions located at equal intervals may be determined on a capacity formation portion, referring to a region on which the first and second internal electrodes 121 and 122 are overlapped. In addition, in a case in which the measurement of an average value is executed with respect to 10 dielectric layers or more, the average thickness of each of the dielectric layers may be more generalized.

In addition, the thickness of the dielectric layer may be defined as an average distance between the centers of the adjacent internal electrodes 121 and 122. For instance, from an image obtained by scanning the centers of the internal electrodes 121 and 122, distances between the adjacent internal electrodes 121 and 122 in 30 positions at equal intervals in the length direction of the internal electrodes may be measured, whereby an average distance between the adjacent internal electrodes 121 and 122 may be calculated. In addition, when such a measurement of the average distance is executed with respect to 10 or more pairs of adjacent internal electrodes, the average distance between adjacent internal electrodes may be more generalized.

A plurality of internal electrodes 120 may be provided in the multilayer body 110. The internal electrodes 120 may be placed on the dielectric layers and arranged to face each other in the lamination direction of the dielectric layers, while having the dielectric layers disposed therebetween through the firing.

The plurality of internal electrodes 120 may be formed of a conductive metal, for example, Ni or an Ni Alloy. The Ni alloy may contain Mn, Cr, Co or Al, together with Ni. The internal electrodes 120 may be fabricated by printing a conductive paste containing a metal powder such as Ni or the like, onto a surface of a ceramic green sheet in a predetermined pattern. Without being particularly limited thereto, a thickness of each of the internal electrodes 120 may be 0.7 μm or less.

According to an embodiment of the present invention, 200 or more dielectric layers, or 500 or more dielectric layers, each having the internal electrodes provided thereon may be laminated.

The plurality of internal electrodes 120 may include a plurality of first internal electrodes 121 and a plurality of second internal electrodes 122, having opposing polarities. Each of first internal electrodes 121 and second internal electrodes 122 may be laminated to face each other in the lamination direction, while having the dielectric layers disposed therebetween.

The plurality of the first internal electrodes 121 may have one ends exposed to the first short face Sf1 of the multilayer body 110, while the plurality of second internal electrodes 122 may have one ends opposed to the exposed ends of the first internal electrodes 121 in the length direction and exposed to the second short face Sf2.

One ends of the plurality of the first internal electrodes 121 exposed to the first short face Sf1 may be connected to a first external electrode 131, while one ends of the plurality of second internal electrodes 122 exposed to the second short face Sf2 may be connected to a second external electrode 132.

As shown in FIGS. 3 and 4, when viewed from the cross-section (W-T) in the width-thickness direction of the multilayer body 110 according to the embodiment of the present invention, the plurality of the first and second internal electrodes 121 and 122 may be offset in the width direction. That is, portions of the adjacent first and second internal electrodes 121 and 122 overlap with each other, while other portions of the adjacent first and second internal electrodes 121 and 122 do not overlap with each other. Hereinafter, an overlapped portion is defined as the portion where the adjacent first and second internal electrodes 121 and 122 overlap with each other, and an offset portion is defined as the portion where the adjacent first and second internal electrodes 121 and 122 do not overlap with each other (that is, the portion where the adjacent first and second internal electrodes 121 and 122 are offset from each other).

Specifically, referring to FIG. 4, in the cross-section in the width-thickness direction (W-T), a thickness td of the dielectric layer, a width t2 of the overlapped portion of the first and second internal electrodes 121 and 122, and a width t1 of the offset portions are defined as shown in FIG. 4. The thickness td of the dielectric layer may be defined as an average thickness of the dielectric layers.

According to an embodiment of the present invention, the cross-section in the width-thickness direction (W-T) may refer to a cross-section taken substantially vertically at the center of the multilayer body 110 in the length direction (L). The cross-section in the width-thickness direction (W-T) may be substantially perpendicular to the length direction of the multilayer body 110.

The first internal electrode 121 may include a first offset portion 121a which is offset with a second internal electrode 122 adjacent thereto in the width direction while having the dielectric layer disposed therebetween, and a first overlap portion 121b which overlaps with the second internal electrode 122. Likewise, the second internal electrode 122 may include a second offset portion 122a which is offset with the first internal electrode 121 adjacent thereto in the width direction while having the dielectric layer disposed therebetween, and a second overlap portion 122b which overlaps the first internal electrode 121.

According to the embodiment of the present invention, the width t1 of the first and second offset portions 121a and 122a may be set to 0.8 to 5.8 μm, thus enhancing breakdown voltage (BDV) properties and preventing deterioration in a high temperature acceleration and humidity resistance. According to an embodiment of the present invention, the width t1 of the offset portion may be the minimum width t1 of the offset portion formed by offsetting adjacent first and second internal electrodes 121 and 122.

By doing so, the first and second internal electrodes 121 and 122 adjacent to each other in the thickness direction, having the dielectric layer disposed therebetween, have lateral sides extending in the length direction of the internal electrodes, which do not overlap to each other. As a result, concentration of an electric field in the lateral sides may be inhibited. That is, with regard to the overlap portions of the first and second internal electrodes 121, 122 in the width direction, the lateral side of the first internal electrode 121 may overlap one face of the second internal electrode 122 at one edge in the width direction, while the lateral side of the second internal electrode 122 may overlap one face of the first internal electrode 121 at the other edge in the width direction.

According to the embodiment, the first internal electrode 121 is fixed in position, whereas the second internal electrode 121 may be alternately offset to the right and left in the width direction with respect to the first internal electrode 121. However, the present invention is not particularly limited thereto and, according to design conditions, the first and second internal electrodes may be arranged in various manners of offset. For instance; (1) the first internal electrode is fixed in position while the second internal electrode may be offset in a right or left direction along the first internal electrode; (2) after stacking the first and second internal electrodes into laminate groups, a first group is offset toward a left side from top to bottom sides in a lamination direction, while a second group is offset toward a right side from top to bottom sides in the lamination direction; (3) the internal electrodes are alternately offset from the left side to the right side every two steps, or other various modifications may be applied.

The ratio (t1/td) of the minimum width t1 of the first and second offset portions 121a and 122a to the average thickness td of the dielectric layer may range from 1 to 10. If t1/td is less than 1, a distance between the ends of the first and second internal electrodes in the width direction may be relatively small, when viewed from the cross-section in the width-thickness direction (W-T). As a result, an electric field strength may be increased, leading to a deterioration in BDV properties to thus increase NG rate in a high temperature acceleration test. Moreover, since a difference in density between a margin portion, in which the internal electrodes are not present, and the overlap portion is high, an NG rate in a humidity resistance test may be increased.

On the other hand, when t1/td exceeds 10, an area of the overlap portion between the first and second internal electrodes is reduced, in turn causing a decrease in capacity. Also, a width of the offset portion is increased, thus decreasing a width of the margin portion and ultimately increasing a cutting fault ratio.

The external electrode 130 may include a first external electrode 131 and a second external electrode 132, which are formed on opposite sides of the multilayer body 110. As shown in FIG. 1, the first external electrode 131 may be provided to cover the first short face Sf1 of the multilayer body 110, while the second external electrode 132 may be provided to cover the second short face Sf2.

According to the embodiment, although the first external electrode 131 and the second external electrode 132 have been formed to cover both short faces of the multilayer body 110, the present invention is not limited thereto. Alternatively, the first and second external electrodes 131 and 132 may be provided to cover both long faces Lf1 and Lf2 of the multilayer body 110.

The first external electrode 131 and the second external electrode 132 may be electrically isolated from each other. The first external electrode 131 may be electrically connected to one ends of the first internal electrodes 121 exposed to the first short face Sf1 of the multilayer body 110 while the second external electrode 132 may be electrically connected to one ends of second internal electrodes 122 exposed to the second short face Sf2, which is opposed to the first short face Sf1 of the multilayer body 110 in the length direction. The external electrode 130 fabricated as described above may serve as an external terminal.

The external electrode 130 may be formed using copper (Cu) or copper alloys, or the like.

Hereinafter, the present invention will be described in detail with reference to the following inventive example and comparative examples, however, the scope of the present invention is not limited thereto.

EXAMPLE

The multilayer ceramic capacitor according to an embodiment of the present invention was fabricated as follows.

After a slurry comprising a powder such as barium titanate ($BaTiO_3$) was applied to a carrier film and dried to prepare a plurality of ceramic green sheets, each having a thickness of 1.25 µm, 1.1 µm and 0.95 µm, a dielectric layer was formed using these sheets.

Next, a conductive paste for an internal electrode comprising nickel particles with an average size of 0.05 µm to 0.2 µm was prepared. By applying the prepared conductive paste for the internal electrode to each of the ceramic green sheets through screen printing, an internal electrode was formed. (This is an example) 230 layers of the internal electrodes were stacked to fabricate a ceramic laminate. In order to vary an offset extent of the internal electrodes during lamination, a width of the offset portion was altered in the range of 0 to 10 µm, followed by lamination.

The prepared ceramic laminate was subjected to isostatic pressing at 85° C. under pressure conditions of 1000 kgf/$cm^2$.

After compression of the ceramic laminate, it was cut into separate chips. The cut chips were maintained at 230° C. for 60 hours under an atmosphere to implement debinding. Afterward, firing was performed at 1200° C. under a reduction atmosphere as well as an oxygen partial pressure of $10^{-11}$ atm to $10^{-10}$ atm, which is lower than Ni/NiO equilibrium oxygen partial pressure, in order to prevent oxidation of the internal electrode. After the firing, the dielectric layers had an average thickness of 0.85 µm, 0.65 µm and 0.55 µm, respectively, while an average thickness of the internal electrode was 0.65 µm. The size of each fired chip satisfied the following dimensions: 0.6±0.09 mm×0.3±0.09 mm×0.3±0.09 mm (L×W×T).

Subsequently, the above prepared chips were subjected to provision of an external electrode, plating, or the like, thereby fabricating a multilayer ceramic capacitor.

A variety of multilayer ceramic capacitor samples were fabricated, depending upon a width of the offset portion in the internal electrode.

The following Table 1 shows comparison results of electrical characteristics of the variety of multilayer ceramic capacitors, depending upon a width of the offset portion in the internal electrode, in particular; BDV properties, electrostatic capacity, cutting fault rate, NG rate in the high temperature acceleration test and NG rate in humidity resistance test.

TABLE 1

|   | t1 (µm) | td (µm) | t1/td | Electrostatic capacity (µF) | BDV (V) | NG rate in high temperature acceleration (%) | NG rate in humidity resistance (%) |
|---|---|---|---|---|---|---|---|
| 1 | 0.4 | 0.85 | 0.47 | 1.22 | 82 | 0.00 | 0.00 |
| 2 | 0.7 | 0.85 | 0.82 | 1.22 | 82 | 0.00 | 0.00 |
| 3 | 1.1 | 0.85 | 1.29 | 1.22 | 83 | 0.00 | 0.00 |
| 4 | 3.1 | 0.85 | 3.65 | 1.21 | 83 | 0.00 | 0.00 |
| 5 | 5.8 | 0.85 | 6.82 | 1.21 | 85 | 0.00 | 0.00 |
| 6 | 7.8 | 0.85 | 9.18 | 1.20 | 87 | 0.00 | 0.00 |
| 7 | 8.7 | 0.85 | 10.24 | 1.20 | 88 | 0.00 | 0.00 |
| 8 | 10.9 | 0.85 | 12.82 | 1.20 | 84 | 0.00 | 0.00 |
| *9 | 0.3 | 0.65 | 0.46 | 1.75 | 61 | 0.25 | 0.00 |
| *10 | 0.6 | 0.65 | 0.92 | 1.75 | 63 | 0.50 | 0.00 |
| 11 | 0.9 | 0.65 | 1.38 | 1.75 | 72 | 0.00 | 0.00 |
| 12 | 3.1 | 0.65 | 4.77 | 1.74 | 74 | 0.00 | 0.00 |
| 13 | 5.6 | 0.65 | 8.62 | 1.73 | 75 | 0.00 | 0.00 |
| *14 | 7.3 | 0.65 | 11.23 | 1.73 | 74 | 0.00 | 2.75 |
| *15 | 9.1 | 0.65 | 14.00 | 1.72 | 75 | 0.00 | 2.75 |
| *16 | 11.1 | 0.65 | 17.08 | 1.72 | 76 | 0.00 | 3.25 |
| *17 | 0.3 | 0.55 | 0.55 | 2.06 | 55 | 0.50 | 0.00 |
| 18 | 0.8 | 0.55 | 1.45 | 2.06 | 65 | 0.00 | 0.00 |
| 19 | 1.3 | 0.55 | 2.36 | 2.06 | 67 | 0.00 | 0.00 |
| 20 | 3.5 | 0.55 | 6.36 | 2.05 | 66 | 0.00 | 0.00 |
| 21 | 5.3 | 0.55 | 9.64 | 2.04 | 67 | 0.00 | 0.00 |
| *22 | 7.0 | 0.55 | 12.73 | 2.04 | 68 | 0.00 | 2.75 |
| *23 | 9.2 | 0.55 | 16.73 | 2.03 | 68 | 0.00 | 3.25 |
| *24 | 11.2 | 0.55 | 20.36 | 2.02 | 69 | 0.00 | 4.00 |

*indicates Comparative Example
*t1: minimum width of an offset portion in an internal electrode, td: average thickness of one dielectric layer From Table 1, the cutting fault rate was expressed as a percentage of samples, among 1000 samples per test specimen, after a cut section test was executed. Insulation breakdown voltage (BDV) properties were assessed by applying DC voltage at a rate of 10V/sec. The NG rate in the high temperature acceleration test was expressed as a percentage of samples, which showed decreased insulation resistance to $10^4 \Omega$ or less within 48 hours after applying 9.45V DC voltages at 135° C., among 400 samples per test specimen. Likewise, the NG rate in the humidity resistance test was expressed as a percentage of samples, which showed decreased insulation resistance to $10^4 \Omega$ or less within 100 hours after applying 6.3V DC voltages at 40° C. and under a relative humidity of 95%, among 400 samples per test specimen.

From Table 1, each of sample Nos. 1 to 8 had a dielectric layer with an average thickness td of 0.85 µm, while each of sample Nos. 9 to 16 had a dielectric layer with an average thickness td of 0.65 µm. Also, for sample Nos. 17 to 24, an (average) thickness td of a dielectric layer was 0.55 µm.

Referring to Table 1, in cases in which the average thickness td of the dielectric layer exceeded 0.65 µm, it can be seen that BDV properties, high temperature acceleration characteristics and humidity resistance were favorable, regardless of the ratio (t1/td) of the minimum width t1 of the offset portion of the internal electrode to the average thickness td of the dielectric layer.

On the other hand, if the average thickness td of the dielectric layer was 0.65 μm or less, it was confirmed that BDV properties, high temperature characteristics and humidity resistance were deteriorated, depending upon the ratio (t1/td) of the minimum width t1 of the offset portion of the internal electrode to the average thickness td of the dielectric layer.

Briefly, it can be understood that sample Nos. 11 to 13 and 19 to 21 having t1/td of 1 to 10, exhibited excellent BDV properties but no deterioration in high temperature acceleration characteristics and humidity resistance. It may be presumed the reason for this may be that, since upper and lower internal electrodes are laminated with an offset formed therebetween in the range described above, a distance between the edges of the upper and lower internal electrodes is relatively increased to thus beneficially influence the foregoing characteristics and, at the same time, a difference in density between the margin portion and the overlap portion is reduced, thereby imparting favorable effects.

Further, with regard to sample Nos. 9, 10 and 17 having t1/td of less than 1, when viewed in the cross-section in the width-thickness direction of the capacitor, since the distance between the edges of the upper and lower internal electrodes in the width direction is relatively short, an electric field strength is increased, which in turn, leads to a deterioration in BDV properties, thus showing a high NG rate in the high temperature acceleration test. Moreover, the difference in density between the margin portion and the overlap portion is great, thus showing exhibit a high NG rate in the humidity resistance test due to structural defects.

In addition, for sample Nos. 14 to 16 and 22 to 24 having t1/td of more than 10, as the width of the offset portion was increased, the width of the margin portion was reduced. As a result, due to a penetration of a plating solution, an occurrence of cracks was increased, leading to poor humidity resistance.

Consequently, according to the examples of the present invention, it can be identified that a multilayer ceramic capacitor with high reliability and various advantages such as enhanced BDV properties, high capacity, and no deterioration in the high temperature acceleration test and the humidity resistance test, may be achieved.

As set forth above, the multilayer ceramic capacitor according to the present invention may realize a decrease in size and an increase in capacity while exhibiting no insulation breakdown even at a high voltage, thus enabling an improvement in reliability.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a multilayer body having a dielectric layer; and
first and second internal electrodes disposed in the multilayer body, the dielectric layer being disposed between the first and second internal electrode;
wherein, in a cross-section taken in a width-thickness direction of the multilayer body, the first and second internal electrodes are offset in a width direction, and an offset portion is defined as a portion where adjacent first and second internal electrodes do not overlap with each other, and
wherein a ratio (t1/td) of a width t1 of the offset portion to a thickness td of the dielectric layer satisfies $1 \leq t1/td \leq 10$,
wherein the width t1 is defined as a minimum width of the offset portion, and the thickness td of the dielectric layer is defined as an average thickness of the dielectric layers, the thickness td of the dielectric layer being 0.65 μm or less.

2. The multilayer ceramic capacitor of claim 1, wherein the second internal electrode is alternately offset to the right and left, in the width direction with respect to the first internal electrode.

3. The multilayer ceramic capacitor of claim 1, wherein the width t1 ranges from 0.8 μm to 5.8 μm.

4. The multilayer ceramic capacitor of claim 1, wherein the multilayer ceramic capacitor has a length and width of 0.6±0.09 mm and 0.3±0.09 mm, respectively.

5. The multilayer ceramic capacitor of claim 1, wherein 200 or more dielectric layers are laminated.

6. The multilayer ceramic capacitor of claim 1, wherein the thickness td of the dielectric layer is a distance between the first and second internal electrodes disposed to be adjacent.

* * * * *